(12) United States Patent
Lassota

(10) Patent No.: US 6,829,981 B2
(45) Date of Patent: Dec. 14, 2004

(54) COFFEE BREWER WITH INDEPENDENT CONTROL OF DISPENSE PERIOD AND BATCH QUANTITY AND METHOD

(75) Inventor: Zbigniew G. Lassota, Long Grove, IL (US)

(73) Assignee: Food Equipment Technologies Company, Inc., Lincolnshire, IL (US)

(*) Notice: Subject to any disclaimer, the term of this patent is extended or adjusted under 35 U.S.C. 154(b) by 231 days.

(21) Appl. No.: 10/078,749

(22) Filed: Feb. 19, 2002

(65) Prior Publication Data

US 2003/0003208 A1 Jan. 2, 2003

Related U.S. Application Data

(60) Continuation-in-part of application No. 09/698,689, filed on Oct. 27, 2000, now Pat. No. 6,565,906, which is a division of application No. 09/131,992, filed on Aug. 11, 1998, now Pat. No. 6,148,717.
(60) Provisional application No. 60/270,103, filed on Feb. 20, 2001.

(51) Int. Cl.[7] .............................. A47J 31/00; A47J 31/41
(52) U.S. Cl. ............................ 99/299; 99/305; 99/323.3
(58) Field of Search ........................ 99/299, 305, 323.3

(56) References Cited

U.S. PATENT DOCUMENTS

| | | | | |
|---|---|---|---|---|
| 4,967,648 A | * | 11/1990 | Helbling | 99/280 |
| 5,168,794 A | * | 12/1992 | Glucksman | 99/295 |
| 5,351,892 A | * | 10/1994 | Conte | 239/304 |
| 6,755,119 B1 | * | 6/2004 | Lyall et al. | 99/315 |

* cited by examiner

Primary Examiner—Anthony Weier
(74) Attorney, Agent, or Firm—James W. Potthast; Potthast & Associates (57) ABSTRACT

A coffee brewer (10, 10' and 10') is provided with a plurality of solenoid controlled, bi-position dispense valves (40, 40'), a size adjustable valve (60) or a combination of both and a programmable controller (18) for controlling the dispense valves in accordance with preselected brew parameters of batch quantity and dispense time duration (FIG. 8).

17 Claims, 8 Drawing Sheets

COFFEE BREWER WITH INDEPENDENT CONTROL OF DISPENSE PERIOD AND BATCH QUANTITY AND METHOD

CROSS REFERENCE TO RELATED APPLICATIONS

This application claims the benefit, under 35 U.S.C. 119(e), of U.S. Provisional Application Ser. No. 60/270,103, filed Feb. 20, 2001, and having the same title and inventor as the present application. This application is a continuation in part of and claims the benefit of U.S. patent application Ser. No. 09/698,689 filed Oct. 27, 2000 now U.S. Pat. No. 6,569,906, which is a divisional application of and claims the benefit of U.S. application Ser. No. 09/131,992 filed Aug. 11, 1998, now U.S. Pat. No. 6,148,717.

BACKGROUND

1. Field of the Invention

This invention generally relates to beverage brewers, and more particularly, beverage brewers that permit selectively changing batch quantities for different brew cycles.

2. Discussion of the Prior Art

Both the time of contact of the hot water with the beverage ingredient and the amount of hot water that is mixed with a given amount of beverage are critical to optimizing the quality of the resulting brewed beverage. Different types of beverage ingredient, such as different types of coffee, and different forms of a given beverage ingredient, such a given ground coffee of different degrees of coarseness required different amounts of hot water for optimum brewing of the resulting beverage. However, until recently, known coffee brewers were unable to easily adjust the quantity of hot water that is dispensed without changing the duration of the dispensing time period. Likewise, it was difficult to easily adjust the duration of the dispense period without changing the quantity of hot water that is to be dispensed.

However, with my invention shown and claimed in U.S. Pat. No. 6,148,717 issued Nov. 21, 2000 to Zbigniew G. Lassota for "Beverage Maker With Intermittent Beverage Liquid Dispenser and Apparatus and Method for Uniform Contact or Brew Ingredient with Brew", which is hereby incorporated by reference, apparatus and methods were shown that enabled easy selectively control of the average rate at which hot water is dispensed into a brew basket of a brewer so as to selectively change the quantity of hot water that is dispensed independently of the duration of the dispense period to optimize brew abstraction from the dry beverage ingredient such as ground coffee during the brew cycle by intermittently operating a single dispense valve. With the invention of that patent is also possible to selectively change the length of the dispense time period without changing the batch quantity, again for purposes of optimizing abstraction, by intermittently operating a single valve.

While intermittent operation works successfully for the intended purposes of fine-tuning control over the dispense period of the brew cycle, repeated operation of the dispense valve is required for each dispense period with attendant mechanical wear and fatigue.

Other brewers are known in which the dispense valve is operated continuously and in which the batch quantity may be changed, but the change in quantity requires a change in the dispense time period and vice versa, and thus the desired degree of control of quantity and dispense period duration is not achievable.

It is also known to use a variable speed pump vary delivery rate on a continuous basis rather than intermittently to enable independent control of quantity and dispense time duration. Use of a pump believed to be subject to high maintenance costs due to the mechanical movement and liming. It is also known to use a flexible tube that are selectively restricted to change the rate of flow into a brew basket but adjustment is achieved only through manual adjustment of a control knob and the use of plastic tubing may be unsuitable for use with food and hot water.

SUMMARY OF THE INVENTION

It is therefore an object of the present invention to provide a brewer and method of brewing that enable independent control of the batch quantities and the duration of the dispense time period during which hot water is dispensed into the brew basket without the need for intermittent operation of a dispense valve or the disadvantages of a variable speed pump or flexible tube.

In accordance with one aspect of the invention this control is achieved by provision of multiple dispense valves that are independently controllable. In one embodiment, more or fewer of the dispense valves are selectively actuated simultaneously during a single dispense time period to respectively increase or decrease the dispense flow rate during the dispense period.

In another embodiment, the dispense valves are of different size, and different rates are achieved during different dispense periods by selectively actuating only one of the valves during the single dispense time period. Actuation of a larger valve results in a greater flow rate and a larger batch size for a dispense period of given duration than actuation of a relatively smaller dispense valve for the same duration.

In yet another embodiment with a brewer of the type in which a fixed quantity of hot dispense water is "dumped", i.e., is dispensed from the hot water tank by draining the tank to a preselected level without the tank being refilled until after the end of the dispense period, the plurality of dispense valves have inlets connected to the hot water tank at the plurality of different preselected levels and different sizes indirectly related to the level at which they are located to enable each dispense valve to "dump" the quantity of dispense water associated with the inlet level during dispense time periods of equal duration.

BRIEF DESCRIPTION OF THE DRAWINGS

The foregoing advantageous features will be described in detail and others will be made apparent from the following detailed description of a preferred embodiment of the invention that is given with reference to the several figures of the drawing in which.

DETAILED DESCRIPTION

Figure 1:
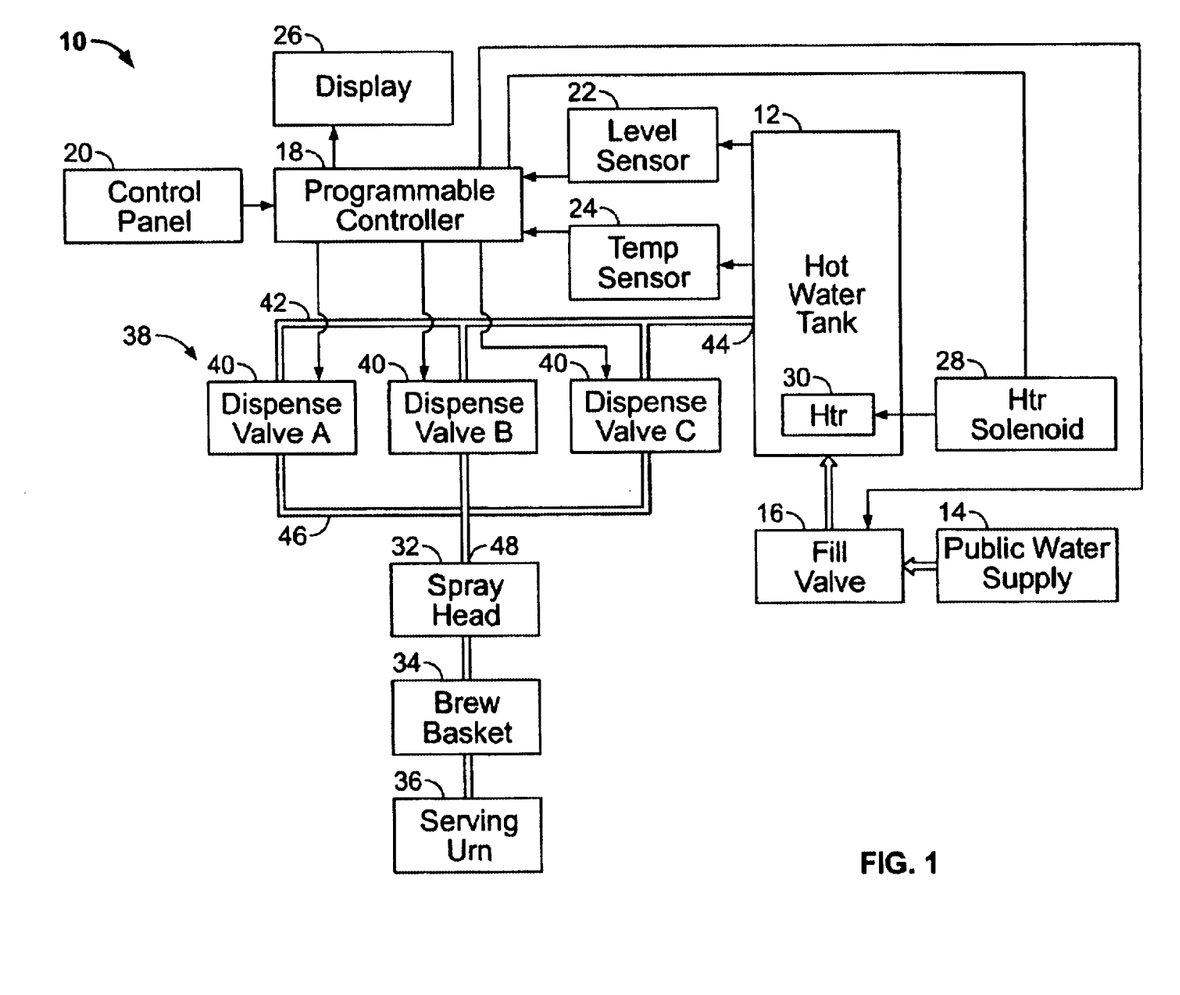
FIG. 1 is a functional block diagram of one embodiment of the invention that employs a plurality of independently controlled dispense valves that have their inlets all connected to the brew basket at the same level.

Referring to FIG. 1, a functional block diagram of a coffee brewer 10 constructed in accordance with one aspect of the invention is seen to include a number of elements that are common to the other embodiments as well as coffee brewers in general. These known elements include a hot water tank 12 that receives cold water from a public water supply 14 through a bi-position solenoid controlled fill valve 16. A programmable controller 18 controls the fill valve 16 and the other active elements of the brewer. The programmable controller 18 has a computer with memory for receiving and storing user preselected parameters or other user programmable information or preselected and current brew parameters from a control panel 20 and automatic inputs from a level sensor 22 and a temperature sensor 24. The programmable controller 18 provides status and other information at a display 26 that in addition to an alphanumeric display may include various operating status lights.

The programmable controller 18 also provides a control signal to operate the fill valve 16. When the level sensor 22 indicates that the level of the water in the hot water tank 12 is at a maximum preselected level, the solenoid controlled fill valve 16 is deactuated to cause it to close, and when the water is detected at a minimum level beneath the preselected maximum level, the fill valve 16 is opened. Thus, during a dispense period of a brew cycle, when water is being removed from the hot water tank, the level is maintained between the preselected maximum level and the preselected minimum level so that the head pressure at the valves remains relatively fixed during the dispense period. The fill valve 16 fills the hot water tank 12 much more rapidly than the dispense valves can empty it so that the preselected level is easily maintained even when the draining of hot water from the hot water tank 12 is at the maximum rate. Because the level and thus the head pressure remain substantially the same throughout the dispense period, measurements of quantity may be easily be made by measuring the length of the dispense period. The quantity of hot water dispensed is directly proportional to the duration of the dispense period.

Likewise, the programmable controller 18 actuates a heater solenoid to apply electrical power to an electrical heater element, or heater, 30 to heat the water in the hot water tank when the temperature sensor 24 indicates that the temperature is beneath a preselected minimum temperature. When the temperature sensor 24 indicates that the temperature has risen above another preselected maximum temperature, then the programmable controller 18 de-energizes the heater solenoid 28. The temperature of the water is thereby maintained between the maximum and minimum preselected temperatures.

For each brew cycle, a preselected amount of hot water is drained from the hot water tank 12 during a preselected dispense time period, corresponding to a preselected quantity of coffee to be made and dispensed through a dispense assembly 38 into a spray head 32. The spray head 32 then sprays the hot water over a mound of dry ground coffee contained within a brew basket 34. The hot water passes through the ground coffee to extract the coffee beverage ingredients desired to make the freshly brewed coffee beverage that then passes from the brew basket 34 into a serving urn 36.

All of these features of the brewer 10, except for the multi-valve dispense assembly 38 and the software in the controller for controlling multiple dispense valves, are conventional, and the details thereof form no part of the present invention. If desired, reference should be made to U.S. Pat. No. 5,000,082 entitled "Beverage Maker and Method Of Making Beverage" issued Mar. 19, 1991 and U.S. Pat. No. 5,331,885, entitled "Semiautomatic Beverage Maker and Method" issued Jul. 26, 1994 of the present inventor and the patents cited therein, all of which are hereby incorporated by reference for general background information and for further details with respect to the structural, mechanical and other details of the conventional components of coffee brewers and the like, with reference to the features noted above, and in general, with reference to the embodiment s described below to the extent conventional elements are disclosed in functional block form only and such details are desired.

In conventional brewers, the dispense assembly consists of a single bi-position valve per brewing station. In the case of a brewer such as brewer 10 in which the level of the hot water tank 12 is maintained during the dispense period of the brew cycle, the bi-position valve is kept continuously open for a preselected time corresponding to a preselected quantity of hot water to be dispensed. The valve has only two positions: fully open and fully closed. When fully open, the flow rate is dictated by the water pressure at the level of the inlet to the bi-position valve. In the case of a fixed level system, such as the brewer 10, the level of the hot water in the hot water tank is kept fixed throughout the dispense period so that the flow rate remains constant throughout the dispense time period. In this fashion, the total quantity of water that is dispensed during a given dispense period is directly proportional to the duration of the dispense period that that the dispense valve is open. If it is desired to double the quantity, then it is necessary to double the dispense time period that the dispense valve is open. Likewise, if it is desired to increase the dispense period, then it is also necessary to increase the quantity.

In my U.S. Pat. No. 6,148,717 referenced above, it is noted that both the time of contact of the hot water with the beverage ingredient and the amount of hot water that is mixed with a given amount of beverage are critical to optimizing the quality of the resulting brewed beverage. While independent control of batch quantity and dispense time period is achieved with the intermittent operation of a single valve as shown in my patent, such control has not been achievable with a bi-position dispense valve that is operated continuously.

In accordance with the embodiment of the present invention shown in FIG. 1, this independent control is achieved with a novel dispense assembly 38. The dispense assembly 38 has a plurality of solenoid controlled bi-position valves 40, preferably three, respectively labeled dispense valve A, dispense valve B and dispense valve C. In one form of the invention, all or at least a plurality of the bi-position dispense valves 40 are substantially identical with respect to the size of their valve openings, each of the valves 40 passing the hot water from the hot water tank at the same rate of flow for the same given pressure. In another form of the invention, all or at least a plurality of the dispense valves are of different sizes associated with different flow rates. The inlets of all the dispense valves are connected through a valve inlet manifold 42 to a single preselected level at hot water tank dispense outlet 44, so they all experience substantially the same head pressure caused by the water in the hot water tank 12. The outlets of all of the dispense valves are connected through a dispense valve outlet manifold 46 to a shared, or common, dispense valve inlet 48 to the spray head 32.

In one mode of operation, preferably, although not necessarily, when all the dispense valves are of the same size, different batch quantities can be obtained without changing the length of the dispense period by selectively simultaneously opening different numbers of the valves. Presuming all the dispense valves are of the same size, and that one valve passes one half gallon of hot water in a dispense period of four minutes when fully open, the when two of the dispense valves are simultaneously opened for the entire dispense period, twice as much, or one entire gallon, will be dispensed during the four minute dispense period. Likewise, if it is desired to make a one and one half gallon batch of coffee, all three valves are opened for the entire dispense period of four minutes. Similarly, if it is desired to produce 0.75 gallon, then one of the dispense valves is kept open for the entire dispense period while another one of the bi-position valves 40 is opened only during the second half of the dispense period. Other combination of valves and time periods during which they are fully and continuously opened may be selected for any other batch quantities, as will be apparent to those skilled in the art.

Alternatively, the plurality of dispense valves 40 are selectively controlled to decrease the dispense time period without altering the batch quantity. For instance, if two of the solenoid dispense valves remaining open for four minutes yields a batch size of one gallon, then the dispense time period can be shortened to 2⅔ minutes by opening all three of the dispense valves without changing the batch size of one gallon. Other like changes of dispense time periods may be made by opening other combinations of dispense valves 40 for preselected time periods to keep batch size the same while changing the dispense time period. Of course, it is also possible to selectively change both the dispense time period and the batch quantity In addition to obtaining the increase flexibility and control over batch size versus dispense time period, the brewer 10 is also more robust than conventional brewers that have only a single dispense valve, for even if one of the plurality of dispense valves 40 should become non-functional, the other dispense valves 40 can continue to be used to make batch quantities less than the maximum sized batch for a given dispense time period.

While the use of all dispense valves 40 of the same size reduces the need for inventorying more than one type of replacement dispense valve and may simplify assembly and repair and simplify programming, it is also contemplated that at least two of the dispense valve 40 are of different size. For instance one of the dispense valves 40, such as valve A, may be twice as large as the other two dispense valves 40, such as valves B and C, to achieve different batch ratios than when they are all the same. In the case of one dispense valve 40, such as valve A, being twice as large as the other two dispense valves 40, opening one relatively small valve, such as valve B, would yield one half gallon; opening two small valves, such as valve B and C, or one large dispense valve, dispense valve A, for instance, would yield one gallon; opening one small valve C and the one larger valve A would yield one and one half gallons; and opening two small valve B and C and the one large valve A would yield two gallons.

Alternatively, the three dispense valves 40 are three different sizes respectively associated with three different flow rates and three correspondingly different batch sizes, such as 0.5, 1.0 and 1.5 gallons. In such case, only a singly one of the valves need be opened at a time to obtain the three noted batch sizes. However, by simultaneously opening a plurality of the different valves additional batch quantities (2.0, 2.5 and 3.0 gallons) can be achieved without changing the dispense time period.

It is preferred that the brewer 10 of FIG. 1 be operated as a continuous fill system in which the level of the water in the hot water tank 12 be kept constant during the dispense period to maintain a uniform pressure and a resultant linear relationship between time and quantity and also to reduce or eliminate recovery time between brew cycles. This is the system described above. However, the embodiment of FIG. 1 with all of the valves connected at the same level of the dispense outlet 44 could also be used in a so-call "dump system". In a dump system type maker the hot water tank is not refilled during the dispense period. Instead, the hot water tank is permitted to drain down to a preselected level associated with a preselected batch quantity.

Disadvantageously, before a new brew cycle can commence the hot water tank must be refilled and the temperature brought up to the preselected minimum temperature. Nonetheless, the brewer 10 of FIG. 1 could be used, or operated, as a "dump system", and the invention contemplates such an embodiment. In such case, because the flow rate slows as the water level goes down and the relationship between time and quantity is not linear, care must be taken to determine the correct dispense time to batch quantity relationship. An empirical determination is recommended. If the tank 12 is allowed to drain down to the level of the dispense outlet 44, then the quantity is fixed by the difference between the level to which the hot water tank is filled before the start of a brew cycle and the level of the dispense outlet 44. However, the time for dispensing this known quantity can be selectively changed by selectively opening one or more of the plurality of bi-position dispense valves 40, as discussed above, whether they are of the same size or of different sizes.

While the dispense valve 40 have been indicated as being only bi-positional valves, and that is the preferred embodiment, it should be appreciated that a multi-positional valve with different sized open positions, such as disclosed in FIGS. 4–7 and described below, could also be used for one or more of the plurality of the dispense valves 40, of FIG. 1. In such case, there would be multiple levels of control over the total dispense valve area—both the number of valves and the size, at least of some or one, of the valves could be selected to selectively vary dispense time period or the quantity, as the case may be.

Figure 2:
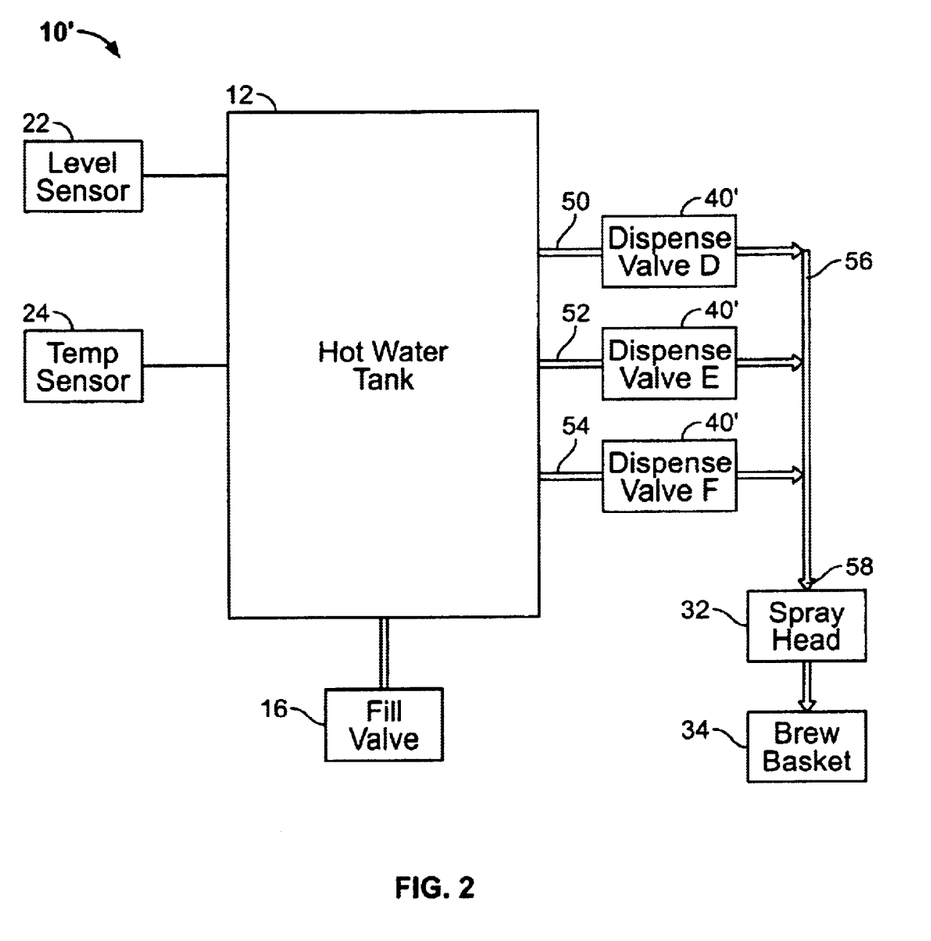
FIG. 2 is a functional block diagram of the relevant portion differing from the embodiment of FIG. 1 of another embodiment of the invention that employs a plurality of independently controlled dispense valves that have their inlets connected to the brew basket at a plurality of different levels, respectively.

Referring now to FIG. 2, another brewer constructed in accordance with the invention is shown in which the hot water tank has three different sized solenoid controlled valve 40' that are labeled dispense valve D, dispense valve E and dispense valve F. Unlike the solenoid valves 40, of FIG. 1, the three solenoid valves 40' have individual valve inlets that connected to the hot water tank 12 at three different locations, or levels, 50, 52 and 54, respectively associated with three different batch quantities, such as 0.5, 1.0 and 1.5 gallons, respectively. An output manifold 56 has a plurality of valve inlets that are connected to the valve outlets of the three dispenser valves 40', respectively, and an outlet 58 that connects all the dispenser valve outlets of the dispenser valve 40' to the spray head 32. Preferably, the brewer 10' of FIG. 2 is "dump system" type of brewer in which the fill valve 16 is not opened and the hot water tank 12 is not refilled until after the end of a dispense period. The batch size is determined by the difference in levels between the maximum level when the hot water tank 12 is filled and the lowest level at which one of the dispense valves 40' is opened until the water in the tank is drained to that level. In know brewers of this "dump system" type there is only a single dispense valve and thus only one batch size, or if it is known to provide multiple valves at different levels, they are the same size such that different batch sizes requires proportionately longer dispense time periods to drain the different quantities.

Preferably, the sizes of the dispense valves 40' are indirectly proportional to the level at which their inlets are connected to the hot water tank 12. For instance, if the dispense valve D is at the level 50 for dispensing 0.5 gallons, the dispense valve E is at the level 52 for dispensing 1.0 gallon and the dispense valve F is at the level 54 for dispensing 1.5 gallons, then the dispense valve D may be one-third the size of the dispense valve E and one half the size of the dispense valve E, so that all of the different quantities may be dispensed during the approximately the same dispense period, when only one of the dispense valves 40' is opened at the same time.

It is, of course, also be possible to increase the total dispense rate by opening a plurality of the dispense valves simultaneously. For instance, if a 1.5 gallon batch were to be made, the dispense time could be shortened from that provide by the opening of only dispense valve F, by also opening dispense valve E or both dispense valve D and E, in addition to opening dispense valve F. Once the level passes the inlet level of a particular dispense valve in question, then of course it can no longer contribute to the dispensing of the hot water, but so long as the water level is above the inlet level it can.

Figure 3:
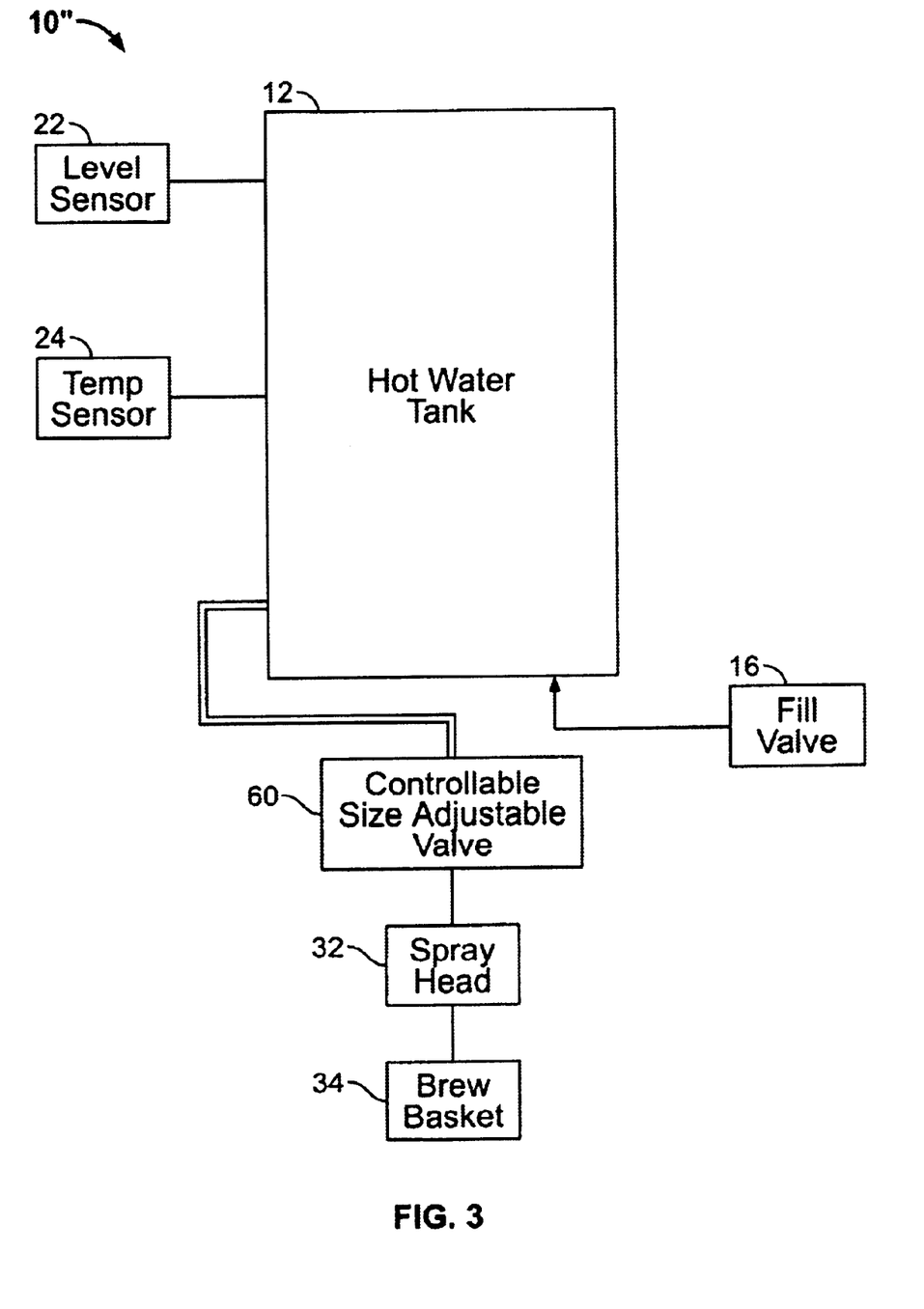
FIG. 3 is a functional block diagram of the relevant portion differing from the embodiment of FIG. 1 of yet another embodiment that employs a single controllable size-adjustable valve to selectively vary dispense times or batch quantity.

Referring now to a third form of the present invention shown in FIG. 3, instead of using a plurality of valves to achieve independent control of batch quantity and dispense time period, a single controllable size adjustable valve 60. The size adjustable valve is has one inlet connected to the hot water tank and an outlet connected to the spray head 32. The controllable size adjustable valve 60 changes in size are incremental and the valve is constructed and operates as described with reference to FIGS. 4, 5, 6 and 7.

Figure 4:
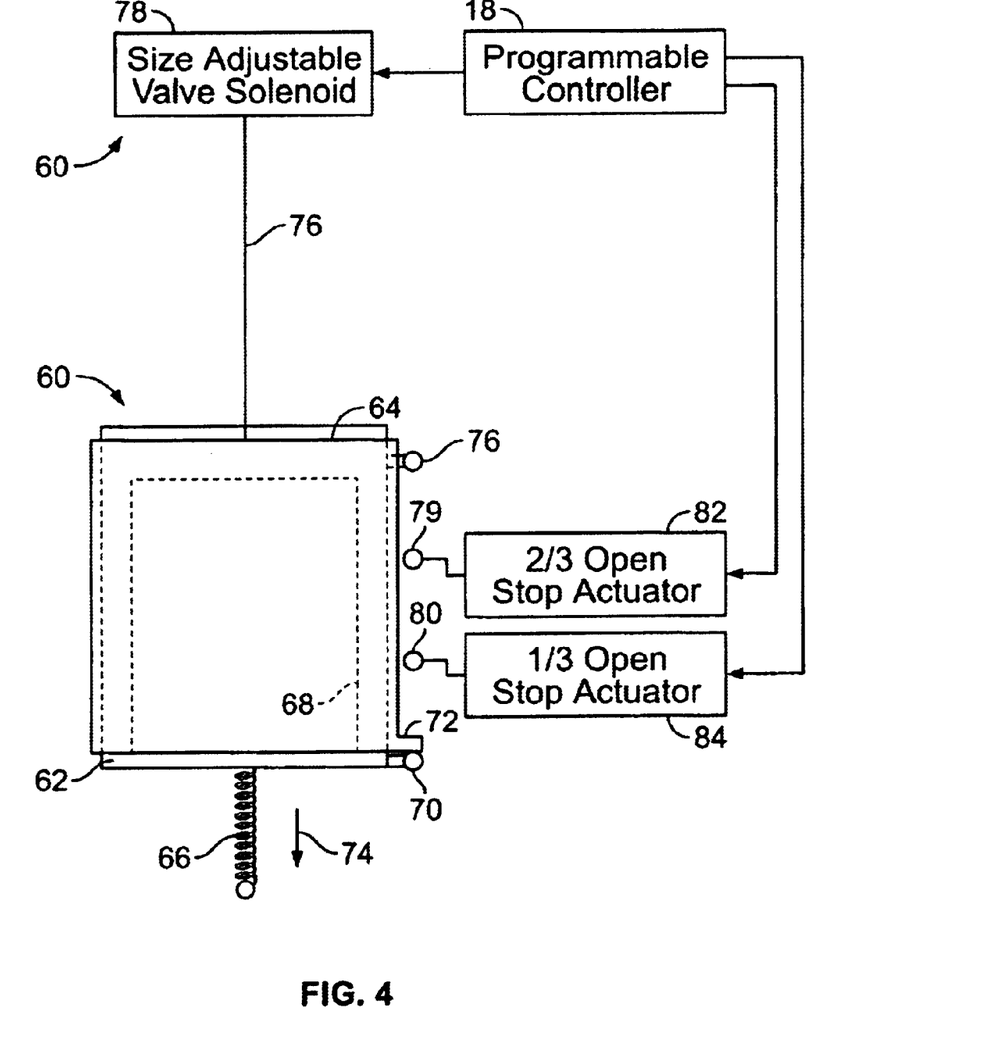
FIG. 4 is a schematic illustration of one embodiment of the controllable size adjustable valve of FIG. 3 when the valve is fully closed.

Referring first to FIG. 4, the controllable size adjustable valve 60 has a valve opening plate 62 that underlies and is slidably attached to a valve closure plate 64 by suitable rails, guides or U-shaped clamps. The valve opening plate 62 is mounted in a fixed position, and the valve closure plate 64 is generally held in blocking, fully closed position, as shown in FIG. 4, by a suitable bias spring 66. In the fully closed position, a valve opening 68 in the valve opening plate 62 is fully covered and blocked by the valve closure plate 64. One side of a fixedly mounted upstanding blocking pin 70 attached to the valve opening plate 66 blocks a laterally extending pin engagement member 72 carried by the closure plate 64 at the end adjacent the spring 66 to prevent the bias spring from causing the valve closure plate 64 to over-travel in the direction of arrow 72.

Figure 5:
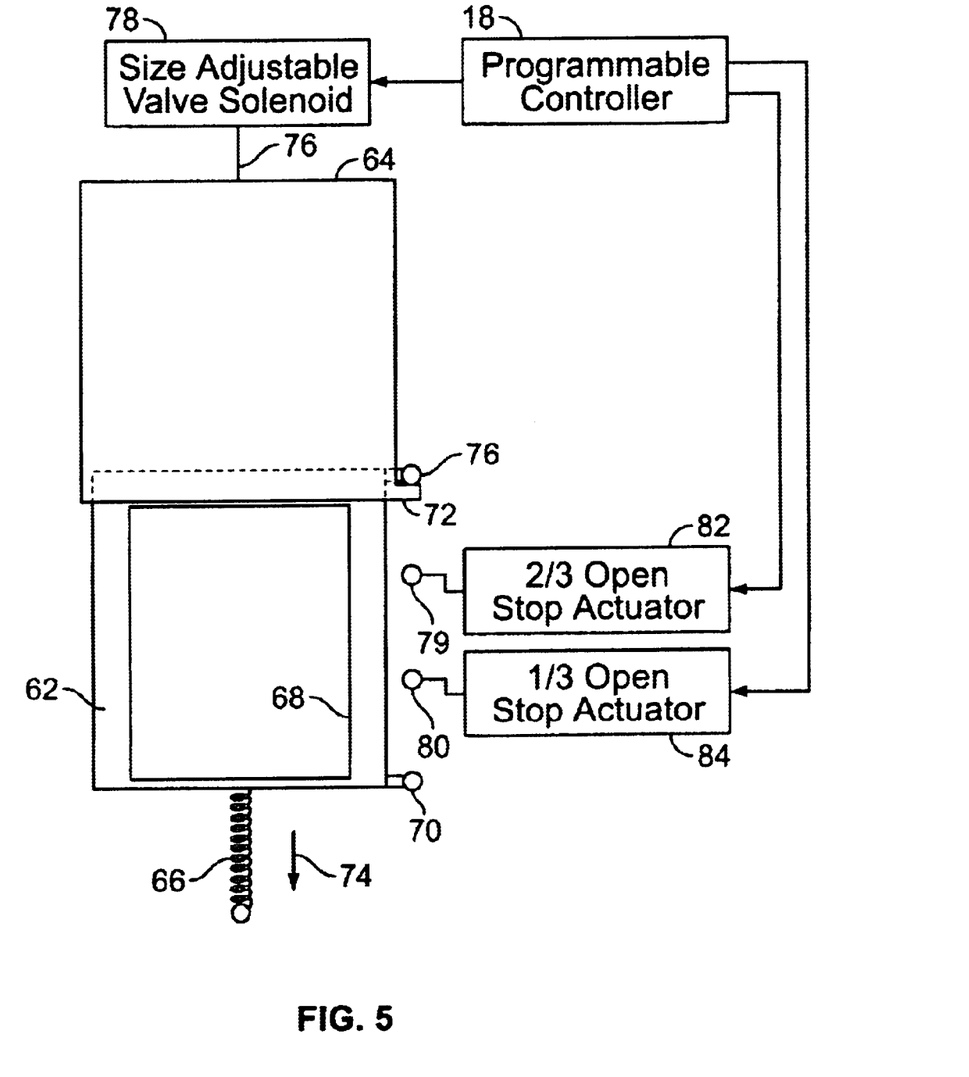
FIG. 5 is a schematic illustration of the valve of FIG. 4 but with the valve in a fully open position.

The other side of the closure plate 64 is connected through a mechanical linkage 76 to a size adjustable valve solenoid 78 that is selectively energized under control of the programmable controller 18. When the solenoid is cause to become energized, overcomes the force of the bias spring 66 and pulls the closure plate 64 in a direction opposite to arrow 74. In the absence of any interference, each time the solenoid became energized it would pull the closure plate to a fully open position in which the entire valve opening 68 is uncovered and unblocked, as shown in FIG. 5. The closure plate 64 is prevented from over-traveling in a direction opposite to that of arrow 74 by engagement of the engagement member 72 with a fixedly mounted upstanding post 76 connected to the side of the valve opening plate 62.

Figure 6:
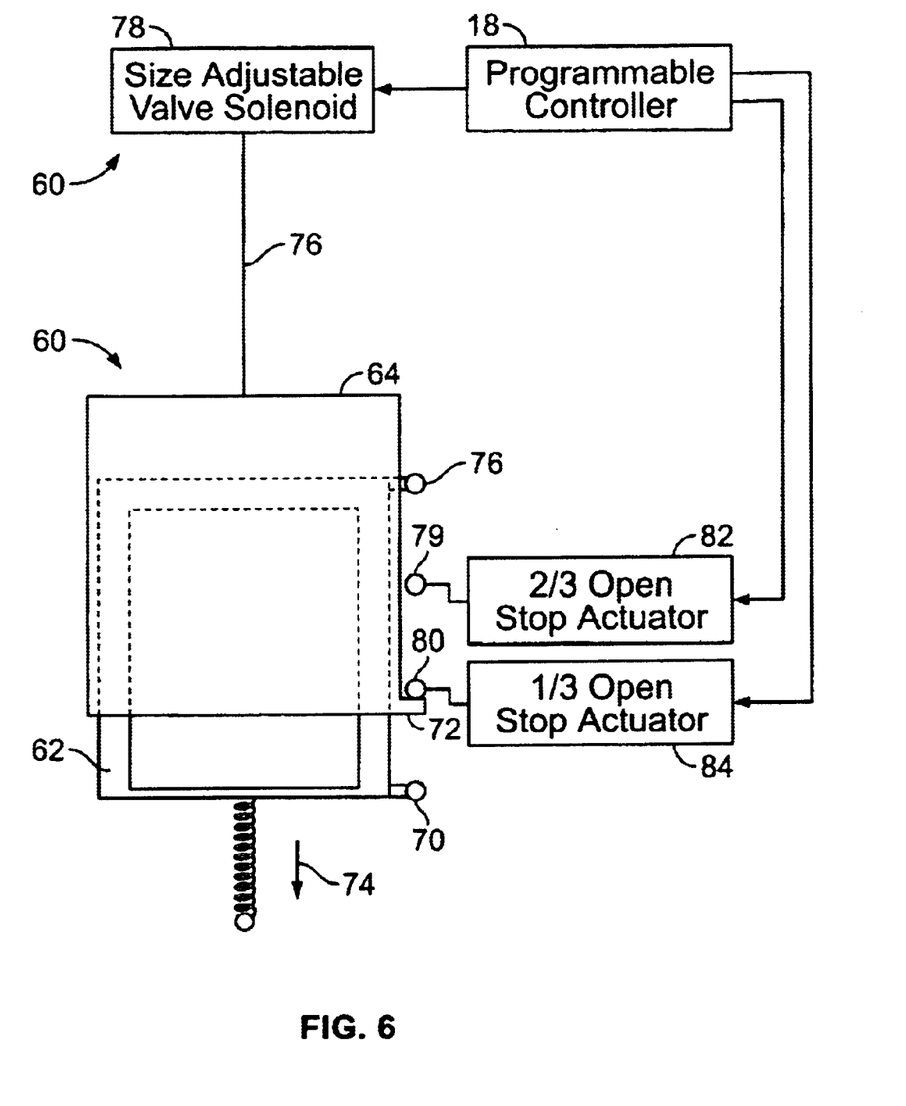
FIG. 6 is a schematic illustration of the valve of FIGS. 4 and 5, but with the valve in a one-third open position.
Figure 7:
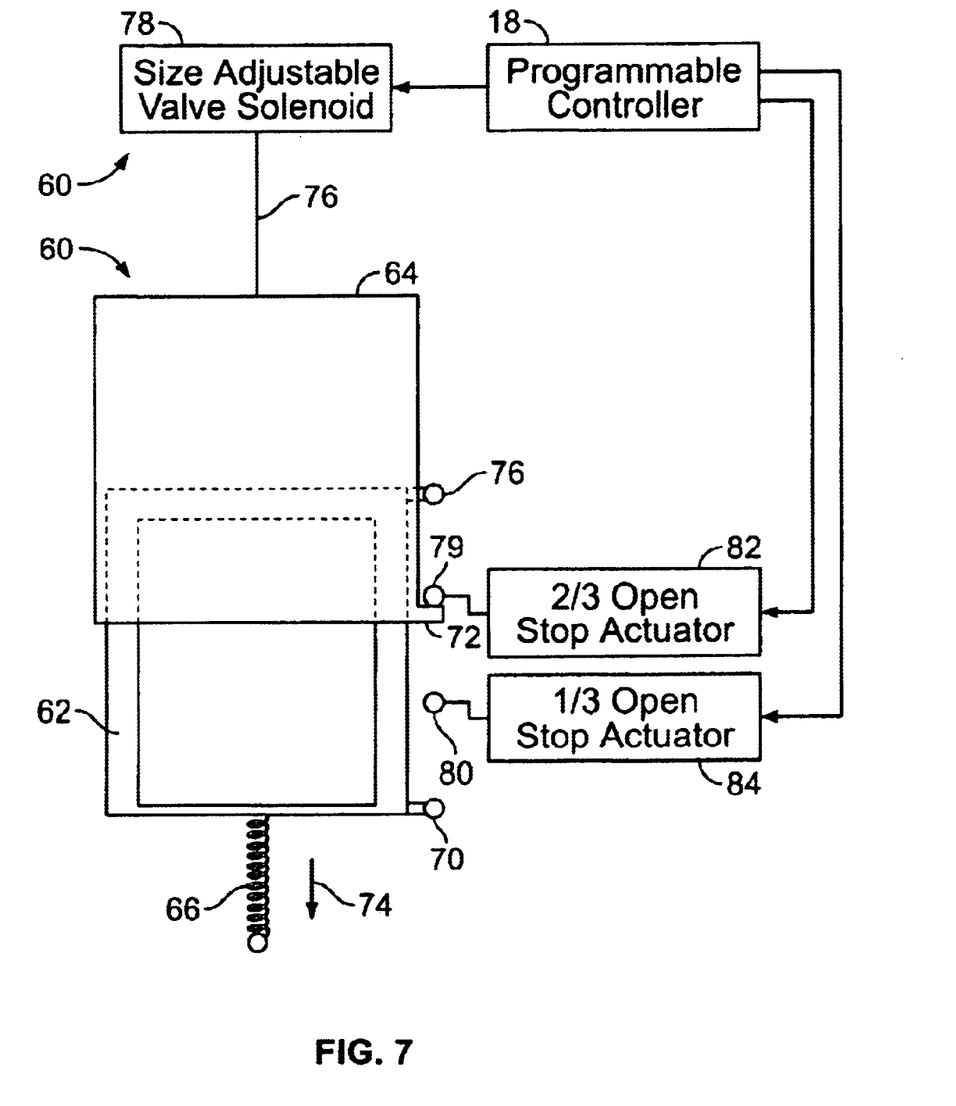
FIG. 7 is a schematic illustration of the valve of FIGS. 4, 5 and 6, but with the valve in a two-thirds open position.

In accordance with the invention, and again referring to FIG. 4, there are two other solenoid controlled, movably mounted, intermediate stop pins 79 and 80 respectively connected to and controlled by stop actuator solenoids, or stop actuators, 82 and 84. The pin 80 is associated with the ⅓ open stop actuator and when energized by the programmable controller 18, moves to an upright position. In this upright position, the pin 80 is in the path of the engagement member 72. If the pin 80 is in an upright blocking position, when the valve closure plate is 64 is pulled in a direction opposite to arrow 74 by the size adjustable valve solenoid 78, then the engagement member 72 is blocked by the pin 80 from moving to the fully open position shown in FIG. 5 and instead moves only to the ⅓ open position shown in FIG. 6. As seen in FIG. 6, the pin 80 is at a longitudinal location to hold the lagging edge of the valve closure plate 64 at a position in which it blocks only ⅔ of the valve opening 68. Likewise, when the ⅔ open stop actuator 84 is energized, the pin 79 moves upwardly to a position to engage the engagement member 72 to block the leading edge of the valve closure plate 64 from moving to a fully closed position. Instead, the leading edge is stopped at a ⅔ open position, as shown in FIG. 7.

In order to select the different sizes for the valve opening, it is of course preferable to follow a timing sequence in which the engagement member 72 is at the fully closed position shown in FIG. 4, at the beginning of a brew cycle. Then, if it is desired to operate the controllable sized adjustable valve 60 at a ⅓ open position, the ⅓ open stop actuator 84 is first actuated to place the blocking pin 80 in the path of the engagement member 72 prior to energizing the size adjustable valve solenoid 78 to start moving the closure plate 64 toward a filly closed position. If the size adjustable valve solenoid 78 is energized too soon, then the pin 80 will not be in a blocking position with respect to the engagement member 72 and the closure plate will not be blocked at the appropriate ⅔ open position. Likewise, the ⅔ open stop actuator must be actuated in time before passage of the engagement member in response to energizing of the size adjustable valve solenoid 78 to block the engagement member 72 with the pin 79 before it goes by on the way to a fully closed position, as shown in FIG. 5. Preferably, the stop actuators 82 and 84 are energized first before energizing of the size adjustable valve solenoid 78, although this may not necessarily technically be required so long as the appropriate pin comes up in time to block the engagement member.

It should be appreciated that this is only one form of size adjustable valve that would work successfully. For instance, instead of having a plurality of solenoid operated blocking pins, like pins 79 and 80, at fixed positions, the positions could be adjustable, such as by mounting the stop actuators on a track parallel to the side of the valve opening 68. While only two fixed-position actuators have been illustrated, many more stop actuators may be added at other fixed or movable or adjustable positions. Instead of having a choice between three positions, there could be ten positions or more or less. If a single stop actuator is mounted on a motor controlled track then the stop position can be place at any location within the resolution capability of a servomotor for moving the stop member to any position along the side of the valve opening at which the engagement member may be engaged.

Also, instead of a size adjustable valve like that shown in FIGS. 4–7, employing stop members at different locations along a sliding valve closure, the valve could be a rotary adjustable valve adjusted manually or automatically, such as a size adjustable kitchen sink faucet or garden hose nozzle, or commercial equivalents, all driven by a servo-motor with position feedback to the controller for selecting the desired valve opening size, or flow rate, or dispense time, if not controlled manually. Alternatively, a circular diaphragm valve of the type having a plurality of members that move relative to one another to change the size of a generally circular valve opening. Any type of controllable valve that can be adjusted in size through the application of control signals from the programmable controller 18 can be used. Importantly, the valve must be made of rigid metal elements that are nonabsorbent of the beverage ingredients and which can be thoroughly cleaned with solvents and hot water without damage to the valve. Preferably, the valve will also be designed reduce calcification or liming problems associated with hot water control systems.

It is of course possible to combine any of the features of the invention to achieve other combinations and permutations, and now that the invention has been disclosed here, it should be obvious to those skilled in the art that such combinations may be made. For instance, analog adjustable valves, such as electromechanically controlled nozzles or faucets, in addition to servomotors for analog adjustment may also have a feed that is solenoid controlled on an on/off basis. The control of the valve size is preferably achieved in accordance with the different techniques illustrated and disclosed as alternatives above depending upon the type and number of size adjustable valves. There are many engineering tradeoffs that will occur to a person in the art of commercial coffee maker design that are not disclosed here as to which approach they may feel is best for a particular coffee maker project. Likewise, it should be appreciated that while only three valves are shown in the embodiments of FIGS. 1 and 2, either only two valves could be used if less selections were desired or more than three solenoid controlled valves could be used if a greater number of selections was desired.

The precise control program of the programmable controller 18 or the type of computer used or the other details of the programmable controller form no part of the invention and depend upon indeterminate factors such as cost and capability that is desired. Generally however the programs works in accordance with the flow chart of FIG. 8. After start 86 of the brew parameter selection program, in step 88 the available batch sizes are displayed on the display 26, FIG. 1, and the user is prompted to select one of the sizes. If in step 90, it is determined that a batch size has been selected, the programmable controller 18 causes the display 26 to show the user the available dispense times that may be available for selection based upon the batch quantity selection made in step 90. Depending upon batch size certain dispense times may or may not be available. In step 94, if the dispense time has been selected the program proceeds to step 96 in which the computer looks up in a table or otherwise determines based upon the batch size and dispense time period selected, which one or ones of the dispense valves should be opened and for how long they should be opened and when they should be opened within the dispense period in the case of the multi-valve embodiments of FIGS. 1 and 2. In the case of the single size adjustable dispense valve of the embodiment of FIG. 3, or if used as one of the valves in the embodiments of FIGS. 1 and 2, the computer determines the degree or size to which the size adjustable valve or valves should be opened and for how long of a time period they should remain open.

Figure 8:
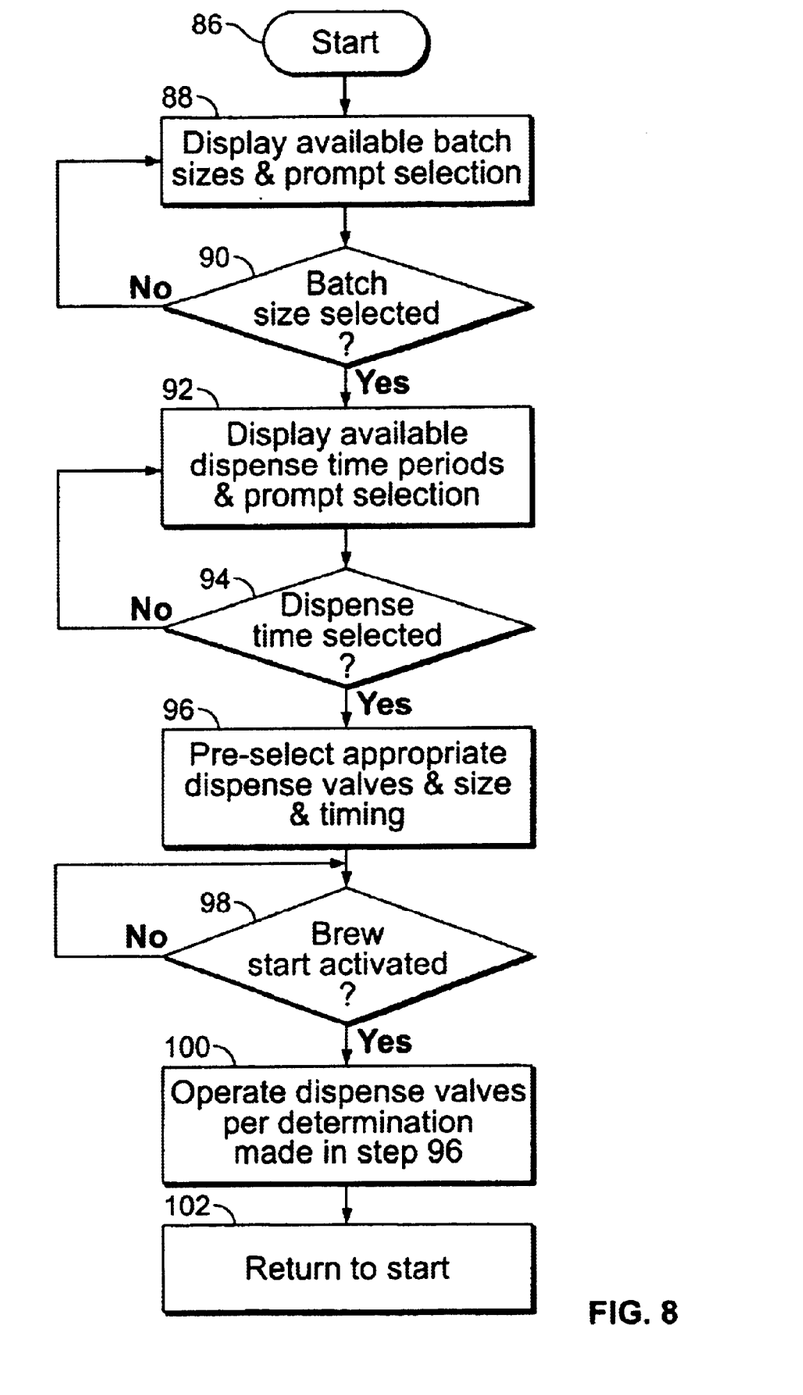
FIG. 8 is a logic flow chart for operation of the brewers of FIGS. 1–3.

The programmable controller then awaits the start of a brew cycle, and in step 98 when it is detected that the start brew switch at the control panel 20 has been actuated to start a new brew cycle, in step 100 the programmable controller operates the dispense valve or valves 40, 40', 60 or any combination of them being used together, in accordance with the preselection, or determination, in step 96 of which dispense valves are opened, the size to which each of the size adjustable valves should be adjusted, for how long the selected dispense valves remain open and when during the dispense period should the selected dispense valves be opened. At the end of the brew cycle, the program returns to start 86.

While specific embodiments has been disclosed in detail here, it should be appreciated that many variations may be made without departing from the spirit and scope of the invention. For instance, while the embodiments have been disclosed as operating the dispense valves continuously once they are opened, it is contemplated that one or more of the dispense valves may be operated incrementally, being repetitively opened and closed throughout the dispense time period, such as is taught in my aforementioned U.S. Pat. No. 6,148,717. Also, one or more of the valves may be opened and then closed at the start of the dispense period to provide a wetting period. Moreover, while the invention has been described with reference to a coffee brewer, it is equally applicable to a tea brewer or any other similar beverage brewer in which water must be passed through an ingredient on a controlled basis of time and quantity to achieve optimum extraction from the ingredient and to optimize the quality of the beverage being brewed.

What is claimed is:

1. In a beverage brewer with a hot water tank, means for maintaining the hot water at a preselected temperature and a brew basket for holding ingredient to be brewed into a beverage by dispensing the hot water through the ingredient, the improvement being a rate selectable dispense system, comprising:

a plurality of bi-position dispense valves, each of said bi-position dispense valves having an inlet and an outlet;

means for connecting the inlet of each of the dispense valves to the hot water tank;

means for connecting an outlet of each of the dispense valves to the brew basket; and means for selectively actuating the plurality of valves to selectively continuously pass hot water from the hot water tank to the brew basket at different preselected continuous cumulative rates.

2. The beverage brewer of claim 1 in which at least two of the plurality of dispense valves are of different sizes associated with different individual flow rate capacities.

3. The beverage brewer of claim 2 in which the inlet connecting means includes means for connecting the hot water tank to the inlet of each of at least two of the plurality of dispense valves at a common level of the hot water tank that is the same for the at least two of the plurality of dispense valves.

4. The beverage brewer of claim 2 in which the inlet connecting means includes means for connecting to the hot water tank the inlet of at least two of the plurality of dispense valves at levels of the hot water tank different from one another.

5. The beverage brewer of claim 4 in which the at least two of the plurality of dispense valves with inlets at levels different from one another are the same as the at least two plurality of dispense valves of different sizes.

6. The beverage brewer of claim 5 in which a smaller one of the at least two of the plurality of dispense valves of different sizes is located at a higher level than a larger one of the at least two of the plurality of dispense valve of different sizes.

7. The beverage brewer of claim 6 in which the relationship between the sizes of the dispense valve relative to the levels of the inlets of the dispense valves is preselected to dispense different preselected quantities of hot water during a common dispense time period when any one of the dispense valve is opened.

8. The beverage brewer of claim 2 in which all of the plurality of dispense valves are of different sizes from one another.

9. The beverage brewer of claim 7 in which all of the plurality of dispense valve have inputs connected to the hot water tank at a plurality of different levels of the hot water tank.

10. The beverage brewer of claim 2 in which at least two of the plurality of dispense valves are substantially equal in size to one another and have a common individual flow rate capacity.

11. The beverage brewer of claim 1 in which at least two of the plurality of dispense valves are substantially equal in size to one another and have a common flow rate capacity.

12. The beverage brewer of claim 11 in which the inlet connecting means includes means for connecting the hot water tank to the inlet of each of at least two of the plurality of dispense valves at a common level of the hot water tank that is the same for the at least two of the plurality of dispense valves.

13. The beverage brewer of claim 12 in which the selectively actuating means includes means for actuating a preselected number of the at least two of the plurality of dispense valves simultaneously.

14. The beverage brewer of claim 11 in which the inlet connecting means includes means for connecting to the hot water tank the inlet of at least two of the plurality of dispense valves at levels of the hot water tank different from one another.

15. The beverage brewer of claim 1 in which the inlet connecting means includes means for connecting the hot water tank to the inlet of each of at least two of the plurality of dispense valves at a common level of the hot water tank that is the same for the at least two of the plurality of dispense valves.

16. The beverage brewer of claim 15 in which the inlet connecting means includes means for connecting to the hot water tank the inlet of at least two of the plurality of dispense valves at levels of the hot water tank different from one another.

17. The beverage brewer of claim 1 in which the inlet connecting means includes means for connecting to the hot water tank the inlet of at least two of the plurality of dispense valves at levels of the hot water tank different from one another.

* * * * *